(12) United States Patent
Anderson et al.

(10) Patent No.: US 10,828,873 B1
(45) Date of Patent: Nov. 10, 2020

(54) TEXTILE COMPOSITE HAVING SORPTIVE AND REACTIVE PROPERTIES AGAINST TOXIC AGENTS

(71) Applicants: Battelle Memorial Institute, Columbus, OH (US); Guild Associates Inc., Dublin, OH (US); The United States Government as Represented by the Secretary of the Army, Natick, MA (US)

(72) Inventors: Erin Anderson, Milford, MA (US); Rachel Rossin, Ashville, OH (US); Joseph Rossin, Columbus, OH (US); Michael Knapke, Plain City, OH (US); Natalie Pomerantz, Newton, MA (US)

(73) Assignees: Battelle Memorial Institute, Columbus, OH (US); Guild Associates Inc., Dublin, OH (US); The United States Government as Represented by the Secretary of the Army, Natick, MA (US)

( * ) Notice: Subject to any disclaimer, the term of this patent is extended or adjusted under 35 U.S.C. 154(b) by 0 days.

(21) Appl. No.: 16/542,599

(22) Filed: Aug. 16, 2019

(51) Int. Cl.
*B32B 19/06* (2006.01)
*B32B 7/12* (2006.01)
*B32B 5/26* (2006.01)

(52) U.S. Cl.
CPC ............... *B32B 19/06* (2013.01); *B32B 5/26* (2013.01); *B32B 7/12* (2013.01); *B32B 2255/02* (2013.01);
(Continued)

(58) Field of Classification Search
CPC ..... B32B 19/06; B32B 7/12; B32B 2307/726; B32B 5/16; A62D 5/00; A62D 9/00
See application file for complete search history.

(56) References Cited

U.S. PATENT DOCUMENTS 5,817,300 A * 10/1998 Cook .................. A61F 5/441
424/66
6,057,488 A 5/2000 Koper et al.
(Continued)

FOREIGN PATENT DOCUMENTS

ES 2677143 7/2018
KR 20180092181 8/2018

OTHER PUBLICATIONS

Glover, "Adsorption of Ammonia by Sulfuric Acid Treated Zirconium Hydroxide", ACS Publications, copyright American Chemical Society, Langmuir 2012, 28, 10478-10487 (Year: 2012).*

*Primary Examiner* — Jennifer A Steele
(74) *Attorney, Agent, or Firm* — Diederiks & Whitelaw, PLC.

(57) ABSTRACT

The present invention relates to a textile composite for the adsorption and breakdown of harmful chemical materials. A support layer and a sorptive and reactive material mounted on the support layer form a protective layer, which is mounted on an inner liner. The protective layer adsorbs and breaks down harmful chemical materials. An outer shell is formed of fabric having an outer surface that is hydrophobic for resisting the passage of harmful chemicals, which may be in the form of vapor, liquid or aerosols. Preferably, the sorptive and reactive material includes zirconium hydroxide, and the support layer includes a fabric material. The zirconium hydroxide is distributed on the fabric material in the amount of at least 20 grams of zirconium hydroxide per square meter. Alternatively, the zirconium hydroxide is distributed in the amount of at least 150 or 200 grams of zirconium hydroxide per square meter.

18 Claims, 17 Drawing Sheets

(52) U.S. Cl.
CPC . *B32B 2264/102* (2013.01); *B32B 2307/7242* (2013.01); *B32B 2307/7265* (2013.01)

(56) References Cited

U.S. PATENT DOCUMENTS

| | | |
|---|---|---|
| 7,445,799 B1 | 11/2008 | Sarangapani et al. |
| 7,744,845 B2 | 6/2010 | Stephenson |
| 7,877,819 B2 | 2/2011 | Von Blucher et al. |
| 8,183,426 B2 | 5/2012 | Cole et al. |
| 8,192,765 B2 | 6/2012 | Sarangapani |
| 8,530,719 B1 * | 9/2013 | Peterson ............... A62D 3/36 |
| | | 588/315 |
| 8,647,419 B2 | 2/2014 | Kaskel |
| 9,566,575 B2 | 2/2017 | Bohringer et al. |
| 9,623,404 B2 | 4/2017 | Hupp et al. |
| 9,907,988 B1 | 3/2018 | Rossin et al. |
| 10,245,456 B1 | 4/2019 | Peterson et al. |
| 2003/0216256 A1 * | 11/2003 | Axtell ............... B01J 20/28023 |
| | | 502/417 |
| 2005/0262620 A1 | 12/2005 | Li et al. |
| 2007/0065658 A1 * | 3/2007 | Bohringer ............... A62D 5/00 |
| | | 428/323 |
| 2007/0181001 A1 * | 8/2007 | Bohringer ............... A62D 5/00 |
| | | 96/154 |
| 2009/0118562 A1 * | 5/2009 | Cole ............... A61L 2/238 |
| | | 588/313 |
| 2010/0081186 A1 | 4/2010 | Lee et al. |
| 2010/0113857 A1 | 5/2010 | Ramakrishna et al. |
| 2014/0287230 A1 | 9/2014 | Walls et al. |

\* cited by examiner

O,S-Diethyl phenylphosphonothioate (DPPT)

Diethyl sulfide

Possible breakdown pathways for a VX
(Nerve) simulant

FIG. 9

Diisopropylfluorophosphate

Cleavage at F-P bond

Possible breakdown pathway for GD simulant

Demeton S — Diethyl phosphate — 2-thioethyl ethyl sulfide or

Diethyl thiophosphate — 2-hydroxyethyl ethyl sulfide

TEXTILE COMPOSITE HAVING SORPTIVE AND REACTIVE PROPERTIES AGAINST TOXIC AGENTS

GOVERNMENT LICENSE RIGHTS

This invention was made with government support under Contract FA8075-14-D-0003 awarded by the US Army. The government has certain rights in the invention.

TECHNICAL FIELD

The present invention relates to a textile composite including a layer with the ability to protect against highly toxic agents and chemicals including chemical warfare agents, industrial chemicals and insecticides.

BACKGROUND

A broad range of chemical weapons have been developed. Most of these chemical weapons are effective when their active ingredients come in contact with skin. Military personnel are most likely to require a defense against such weapons. In response, the United States Department of Defense (DoD) has developed numerous ways to counter chemical weapons, including detectors, specialized clothing and products designed to decontaminate skin exposed to such weapons. Unfortunately, with the threat of terrorism increasing, first responders are also in need of protection against chemical weapons. Chemical weapon attacks are not frequent, such that any garments designed to protect skin may be used for relatively long periods of time between potential attacks. The garments may be laundered multiple times over the course of their service life, and any protective agents in the garments must remain effective after being laundered several times.

In addition to chemical weapons, there are certain agrichemicals such as pesticides which work in a similar manner to the active ingredients in chemical weapons. There is a need to protect those who may be exposed to such chemicals, such as first responders, workers in industrial settings, agricultural workers, and those who work in settings with potential for environmental exposures to agrichemicals.

There are a variety of chemical warfare agents, with a range of toxic effects to the human body. Some common chemical warfare agents are bis-(2-chloroethyl)sulfide (HD or mustard gas), pinocolyl methylphosphonofluoridate (GD) and O-ethyl S-(2-diisopropylamino)ethylmethylphosphonothiate (VX). In addition, there are other agents such as organophosphoruous (OP) nerve agents as well as analogs and derivatives of these agents. Chemical warfare agents are generally delivered as aerosol mists, liquids and/or vapors which become effective if inhaled or allowed to permeate into skin. Without proper protective gear, exposure to a chemical warfare agent may be lethal. This is especially true for nerve agents, which are produced and stockpiled for both industrial use and as chemical warfare agents. One class of nerve agents with a high level of potential lethality is the class that includes organophosphorus-based ("OP") compounds, including, but not limited to, Sarin, Soman, and VX. The organophosphorus-type materials typically manifest their lethal effects against animals and people by inhibiting acetylcholine esterase enzyme (AChE) at neuromuscular junctions between nerve endings and muscle tissue to produce an excessive buildup of the neurotransmitter acetylcholine. This effect results in paralysis and death in a short time. In addition to the concerns about chemical warfare agents, there is also a growing need in the industry for protecting against industrial chemicals and/or insecticides, for example, AChE-inhibiting pesticides such as parathion, paraoxon and malathion. Thus, it is critical to be able to effectively stop a broad spectrum of toxic agents, including, but not limited to, organophosphorus-type compounds, from penetrating protective clothing. Chemical warfare agents and related toxins are so hazardous that simulants have been developed for testing protective clothing. HD simulants include 2-chloroethylethyl sulfide (CEES) and 2-chloroethylphenyl sulfide (CEPS). G-agent simulants include dimethyl methyl phosphonate (DMMP). VX simulants include O,S-diethyl phenylphosphonothioate (DEPPT).

Protective clothing works in several different ways. Some protective suits are made of material that is impermeable to air or water vapor, usually a multi-layered polymer composite material. However, this type of garment can easily trap body heat and prevent sweat from evaporating, which leads to people overheating. Protective clothing that does allow the passage of water vapor and is air permeable, but also stops the passage of toxic material is highly desirable. Since protective suits may have to be used for relatively long periods of time heat buildup is unacceptable. Therefore, suits have been developed that employ air permeable materials, such as woven or nonwoven natural and synthetic textiles.

In particular, air permeable protective suits have been designed with an absorbent layer to trap toxic chemicals and chemical warfare agents. Typically, the absorbent layer is formed with activated carbon. The activated carbon strongly absorbs toxins and prevents them from permeating through the protective garment to the wearer, so that there is little danger to the person wearing the protective suit. In the event the suit is damaged and does allow the passage of some toxins, the activated carbon will even absorb those toxins that have passed through the suit and provide a level of protection.

Such air permeable suits are formed from activated carbon particles which are bonded to a textile carrier material, or by carbonizing a textile to form activated carbon cloth. The carrier material is used as a middle layer of the protective garment and the garment usually also includes an outer protective material to reduce the passage of water and an inner liner to provide comfort to the wearer. More details regarding protective clothing employing activated carbon can be found in U.S. Patent Application Publication No. 2005/0262620 and U.S. Pat. Nos. 8,647,419 and 9,566,575, all of which are hereby incorporated herein by reference.

While clothing employing activated carbon is somewhat successful in protecting people from chemical weapons, such clothing does have its disadvantages. The production of activated carbon is relatively expensive and can consume large amounts of energy. Also activated carbon only works by adsorption and does not affect the toxins in other ways. That is to say, the toxins are not destroyed but are merely retained within the pores of the activated carbon. The toxins will pass through the carbon overtime, and may be displaced by exposure to battlefield contaminants that include for example fuel vapors. The carbon is a non-specific sorptive, it is not reactive to neutralize toxic agents, and there are significant limitations regarding long term storage and wearing of garments with carbon based protective clothing. Specifically, the effectiveness of such protective garments diminishes over time. Therefore, there exists a need in the art for a more effective protective garment system that protects a wearer of the garment in multiple ways.

SUMMARY

The present invention relates to a textile composite that includes a protective layer for the absorption and breakdown of harmful chemical materials. The textile composite also includes an inner liner or layer formed from a vapor permeable fabric allowing the passage of moisture vapor formed by perspiration. The protective layer comprises a sorptive and reactive material mounted on a support layer. The protective layer is mounted on the inner liner. A sorptive and reactive material is defined as a material that will absorb or adsorb toxic chemicals and subsequently detoxify the adsorbed or absorbed toxic chemical. Zirconium hydroxide, aluminum oxide, silicon-aluminum oxide, magnesium oxide and titanium dioxide are examples of sorptive and reactive materials. Zirconium hydroxide is the preferred sorptive and reactive material. The protective layer adsorbs or absorbs and breaks down (i.e. detoxifies) harmful chemicals. The textile composite further includes an outer layer or shell that is formed of fabric having an outer surface that is omniphobic for resisting the passage of harmful chemicals which may be in the form of vapor, liquid and/or aerosols. The outer layer is mounted on the protective layer. Preferably, the sorptive and reactive material includes zirconium hydroxide ($Zr(OH)_4$) and the support layer includes a fabric material. The zirconium hydroxide is distributed on an area of the fabric material in the amount of at least 20 grams of zirconium hydroxide per square meter ($g/m^2$). Alternatively, the zirconium hydroxide is distributed on an area of the fabric material in the amount of at least 150 grams per square meter, between 150 and 200 grams per square meter or at least 200 grams of zirconium hydroxide per square meter. The zirconium hydroxide is mounted onto the fabric material in one of several preferred ways. For example, the zirconium hydroxide may be laminated onto the fabric material using an adhesive or adhesive web, or a chemical binder is used to secure the zirconium hydroxide to the fabric material. The fabric material is preferably a knit, woven, or nonwoven material and is a natural material, synthetic material, or a blend of natural and synthetic materials. Preferably, the fabric material is cotton, and the support layer also includes an aerosol resistant coating. Alternatively, the fabric material is made of polyester.

The zirconium hydroxide used in the protective layer may be surface treated in many ways and come in different sizes or forms. Preferably, the zirconium hydroxide has a high porosity and contains both bridging and terminal hydroxyl groups. A preferred zirconium hydroxide has a surface area greater than 100 $m^2/g$ and a pore volume greater than 0.25 $cm^3/g$. A more preferred zirconium hydroxide has a surface area greater than 300 $m^2/g$ and a pore volume greater than 0.5 $cm^3/g$. A more preferred zirconium hydroxide has a surface area greater than 400 $m^2/g$ and a pore volume greater than 0.7 $cm^3/g$. Zirconium hydroxide may be employed in many geometric forms ranging from powders on the order of 6 μm in size to granules up to 200 μm or greater in size. Beads or microbeads, such as those prepared by spray drying, may also be employed. The zirconium hydroxide may be treated with hydrogen peroxide, alumina or tungsten. Alternatively, sulfated zirconium hydroxide or super acidic zirconium hydroxide may be used.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings.

FIG. 9 is a schematic view of a breakdown pathway for a VX nerve agent simulant.

DESCRIPTION OF THE PREFERRED EMBODIMENTS

Figure 1:
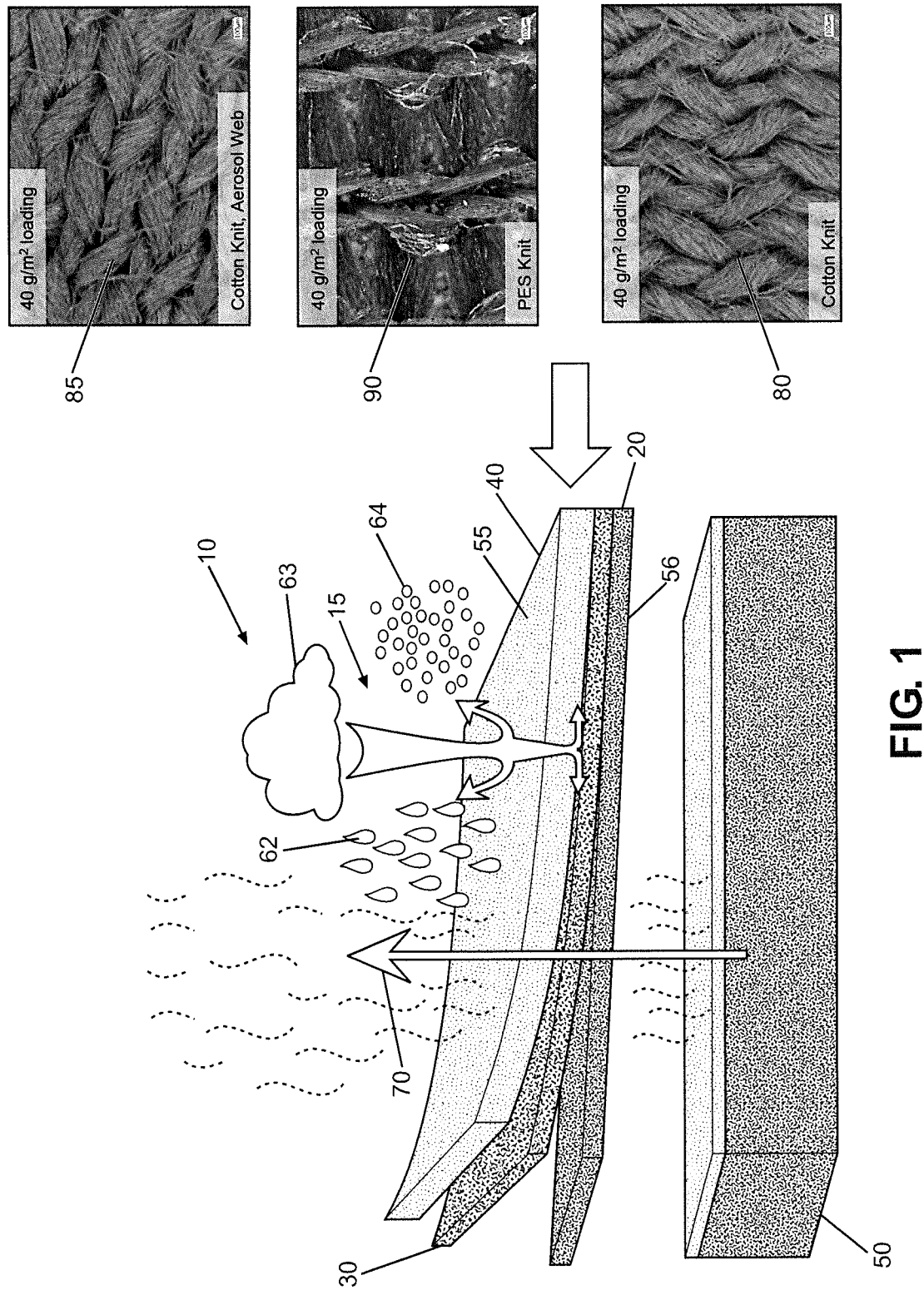
FIG. 1 is a cut-away perspective schematic view of a textile composite according to a preferred embodiment of the invention.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary. While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

As used in this specification and the appended claims, the singular forms "a", "an" and "the" include plural referents unless the content clearly dictates otherwise. As used in this specification and the appended claims, the term "or" is generally employed in its sense including "and/or" unless the content clearly dictates otherwise.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. All percentages are by weight unless otherwise indicated.

FIG. 1 shows a textile composite 10 formed in accordance with a preferred embodiment of the invention. Textile composite 10 comprises multiple fabric layers, including an outer layer 40, protective layer 30, an inner liner 20, and may also include a protective barrier against aerosols. Textile composite 10 may be made of natural or synthetic materials, or blends of natural and synthetic materials, and may be knit, woven, or nonwoven depending on the specific layer, level of stretch desired, and application of the textile. Textile composite 10 is designed to protect against chemical warfare agents and other toxins 15 and is designed for military and civil purposes (e.g., protective garments or clothing). Inner liner 20 is designed mostly for comfort of the skin 50 of a person wearing textile composite 10 as a protective garment. Therefore, inner liner 20 is preferably made of a soft material that allows for person's skin 50 to sweat effectively. As such, inner liner 20 is preferably permeable to air and water vapor and can be a flat textile material, especially a woven fabric, a knitted fabric, a stitched fabric, a laminated fabric, a textile composite, a fleece or a non-woven fabric. Inner liner 20 is preferably flexible but also strong enough to support additional layers such as protective layer 30 and outer layer 40.

Outer layer 40, which is shown at the top of the illustration, serves as the outer layer of textile composite 10 and is a durable and protective material which resists the passage of harmful chemicals in the form of vapors, liquids, and/or aerosols. Outer layer 40 may be treated with a protective coating such as a hydrophobic, omniphobic, and/or flame-resistant coating. Outer layer 40 is preferably treated with an omniphobic coating. Schematically, upper surface 55 is an omniphobic surface which may have an aerosol protective layer underneath, while surface 56 represents the primarily sweat/moisture wicking side. Omniphobic surface 55 repels water, oils and liquid agent droplets from textile composite 10, thereby protecting protective layer 30 from liquid contamination. More specifically, chemical warfare agent 15 may be in liquid form 62, in a vapor 63 or in an aerosol 64. Regardless, outer layer 40 will block or slow the passage of chemical warfare agent 15 as shown in FIG. 1. Details of how to produce a hydrophobic surface can be found in United States Patent Publication No. 2005/0262620, which is incorporated herein by reference. Outer layer 40 will still allow the passage of water vapor 70 from skin 50 to allow for evaporative cooling and comfort of the person wearing textile composite 10 as a protective garment.

Protective layer 30 includes a sorptive and reactive material that will adsorb and break down toxic agents. Protective layer 30 is able to adsorb and break down HD, GD, VX, organophosphate agents, and AChE-inhibiting agents. Protective layer 30 preferentially includes zirconium hydroxide ($Zr(OH)_4$), which is sorptive and reactive against toxic chemicals, including AChE-inhibiting chemical warfare agents.

Zirconium hydroxide is a porous, amorphous white powder that is insoluble in water. The structure of zirconium hydroxide can be represented as a two-dimensional square lattice, each connected by a double hydroxyl bridge yielding a stoichiometric zirconium hydroxide. Zirconium hydroxide particles contain both terminal and bridging hydroxyl groups. Zirconium hydroxide may be prepared by precipitating zirconium salts, such as for example zirconium oxynitrate and zirconium oxychloride, in aqueous solutions using alkaline solutions to bring about precipitation. Examples of alkaline solutions include ammonium hydroxide, potassium hydroxide and sodium hydroxide. The zirconium hydroxide is then subject to a drying process which may affect pore volumes formed in the final zirconium hydroxide powder. Alternatively, zirconium hydroxide may be purchased from a commercial source.

Zirconium hydroxide is not only sorptive of chemical warfare agents, zirconium hydroxide also has proven reactivity with GD, HD and VX in solution. Therefore, zirconium hydroxide both adsorbs/absorbs and detoxifies multiple chemical warfare agents. Also, as shown below, zirconium hydroxide shows resilience to contaminants and laundering.

The zirconium hydroxide may include surface treatments or additional functionalizations to improve its performance, including but not limited to treatments or functionalizations with hydrogen peroxide, aluminum oxide, alumina, silica, tungsten, acidification, or calcination. These surface treatments and functionalizations are used to tailor the sorptive properties and specific reactivity of the zirconium hydroxide. Hydrogen peroxide treatment of zirconium hydroxide has been shown to make the zirconium hydroxide more effective at protecting against chemical warfare agents, as also shown more fully below.

The size of the zirconium hydroxide may range from 1 micron to 200 microns, depending on the base particle chosen, and the zirconium hydroxide may be distributed in the textile composite as single particles or in a granule mesh with a larger volume than single particles alone. Loading density of the zirconium hydroxide into the textile composite typically ranges from 20 to 300 grams per square meter, with an optimal loading at 200 grams per square meter. The zirconium hydroxide is mounted onto a support layer in the protective layer. For example, the zirconium hydroxide may be laminated directly onto a support layer using an adhesive or adhesive web, dip coating, microwaving, chemical attachment, or chemical bonding. Alternatively, the zirconium hydroxide is mounted onto a separate textile substrate or attached directly onto the underside of the outer layer.

Figure 3:
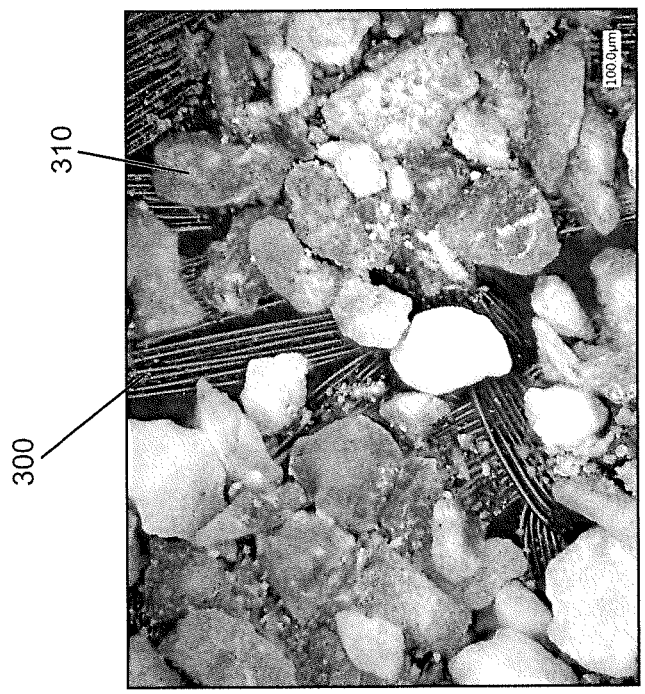
FIG. 3 shows zirconium hydroxide laminated onto a textile as viewed under a light microscope.
Figure 2:
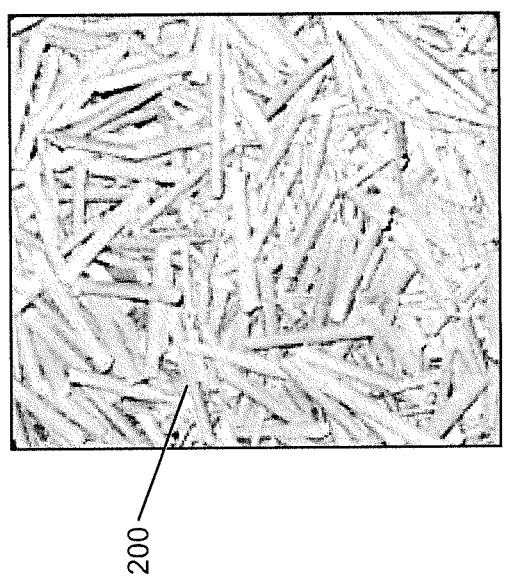
FIG. 2 shows zirconium hydroxide briquettes formed using a roll compactor.

Protective layer 30 is preferably formed as a base knit layer of fabric with zirconium hydroxide laminated into the fabric. Layer 30 is preferably formed from a cotton knit 80, with or without an aerosol web 85, or from a polyester knit 90. The zirconium hydroxide is preferably formed into briquettes 200 using a roll conveyor, as shown in FIG. 2, and then laminated onto the base knit layer, as shown in FIG. 3. Zirconium hydroxide 310 is distributed on an area of fabric material 300 in the amount of at least 20 grams of zirconium hydroxide per meter squared of area of fabric material 300. Alternatively, zirconium hydroxide is distributed in the amount of at least 150 grams per meter squared or more preferably at least 200 grams of zirconium hydroxide per meter squared of area of fabric material 300. The zirconium hydroxide is mounted onto the fabric in one of several preferred ways. For example, zirconium hydroxide 310 can be laminated onto fabric material 300, as shown in FIG. 3, or an adhesive can be used to secure the zirconium hydroxide to the fabric material.

Inner liner 20 is formed from a vapor permeable fabric, which allows the passage of moisture vapor formed by perspiration and the wicking of liquid sweat away from the skin. The inner liner may be incorporated in the Rhin of a hung liner, or it may be laminated directly to the protective layer 30.

An aerosol protective liner maybe included in the textile composite. This may be in addition to the substrate the zirconium hydroxide is attached to, or it may be the substrate the zirconium hydroxide is attached to, using methods detailed above.

Figure 4:
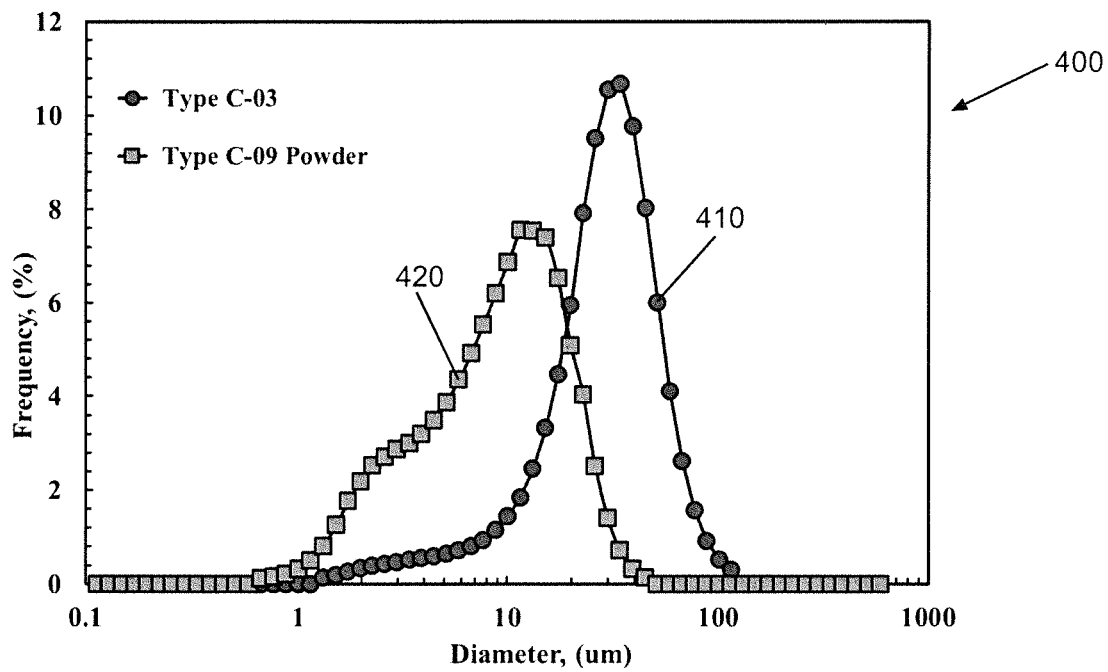
FIG. 4 is a graph showing the particle size distribution of two types of zirconium hydroxide.
Figure 5:
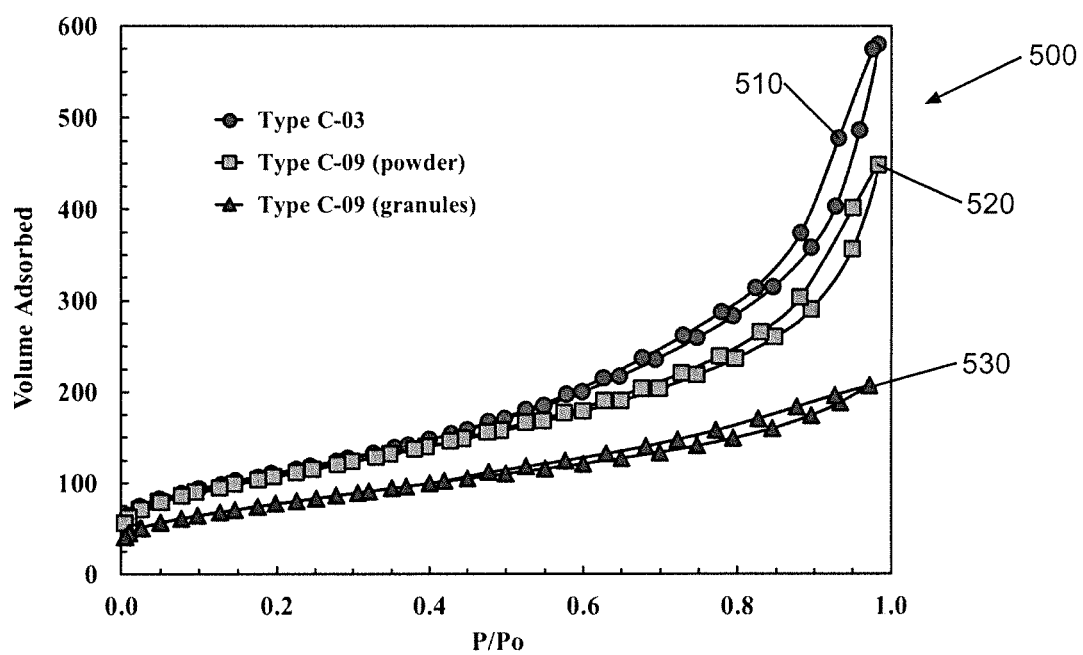
FIG. 5 is a graph showing a Nitrogen ($N_2$) adsorption/desorption isotherm for different types of zirconium hydroxide.

FIG. 4 is a graph 400 that shows the particle size distribution of zirconium hydroxide in protective layer 30 as measured by laser light scattering. Graph 400 shows the diameter of the particles versus the frequency of each size of particle. Two types of zirconium hydroxide, type C-03 [zirconium hydroxide is spray dried to form microbeads] and type C-09 [powders on the order of 6 μm in size to granules up to 200 μm or greater in size], are shown employed in protective layer 30. Multiple particle sizes (or granule mesh sizes) are found in zirconium hydroxide powders and these two particle types represent only a selection. Size, surface area, and pore volumes differ due to the different processes used to produce the different types of zirconium hydroxide powder. For type C-03, the diameters of the particles of zirconium hydroxide mostly range from 10 to 100 micrometers as shown in FIG. 4 by line 410. For powdered type C-09 zirconium hydroxide, the diameters of the particles mostly range from 6 to 40 micrometers as shown by line 420. The porosity of the zirconium hydroxide powders can be measured by determining the amount and rate of nitrogen adsorbed and desorbed by each zirconium hydroxide sample. The $N_2$ adsorption/desorption isotherms for zirconium hydroxide samples to measure porosity are shown in graph 500 of FIG. 5. Type C-03 is shown by reference numeral 510 while type C-09 (powder) and type C-09 (granules) are shown by reference numerals 520 and 530 respectively. Graph 500 shows measured volume adsorbed, which is related to pore volumes. We can see the differing volumes of different types of zirconium hydroxide due to the drying processes associated with the different types of zirconium hydroxide.

Figure 6:
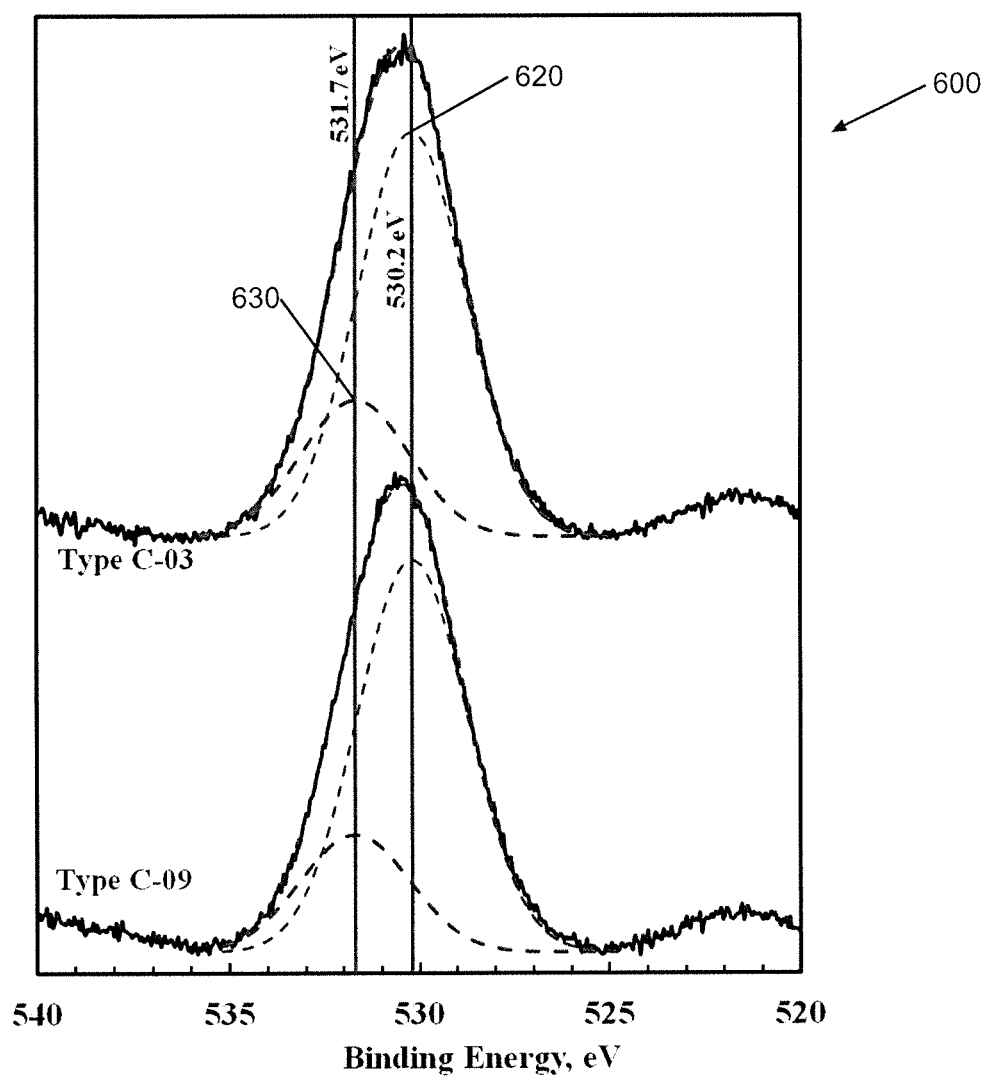
FIG. 6 is an x-ray photoelectron spectrum for two types of zirconium hydroxide.

FIG. 6 is a graph 600 showing the results of an X-ray Photoelectron Spectroscopy (XPS) scan of the zirconium hydroxide. The scan shows the amount of terminal hydroxyl groups present in the sample. The amount of terminal hydroxyl groups is important since the terminal hydroxyl groups provide chemical reactivity thus providing for the removal of acid gases and HD. The XPS spectra shows bridging oxygen at 530.2 eV (indicted at 620) and terminal hydroxyl groups at 531.7 eV (indicated at 630). Note that the amount or yield of terminal hydroxyl groups for both type C-03 and type C-09 zirconium hydroxide can be seen to be about 25% of the total amount.

Figure 7:
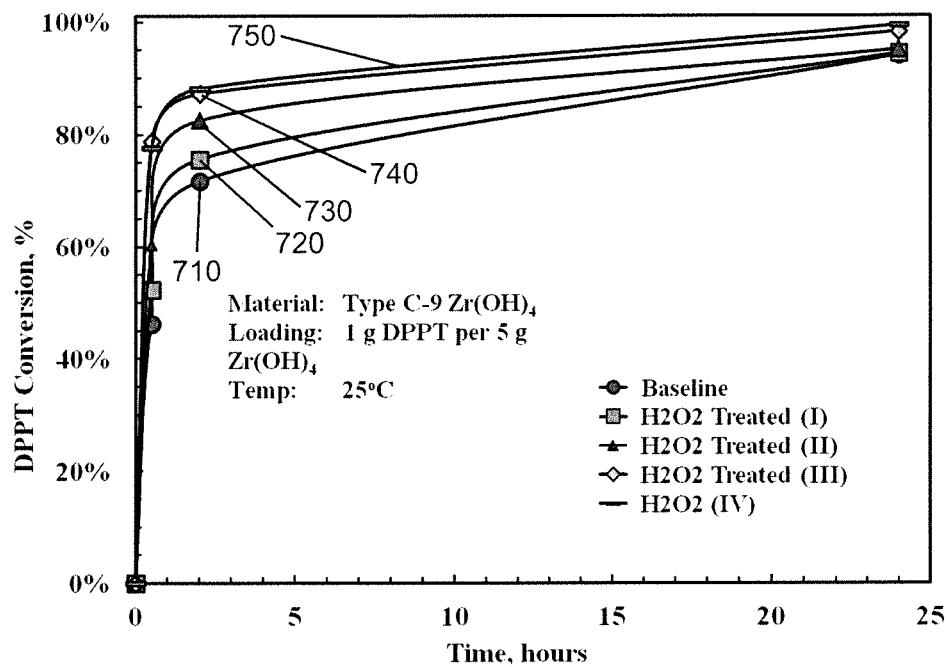
FIGS. 7 and 8 are graphs showing the effect of treating zirconium hydroxide with hydrogen peroxide.
Figure 8:
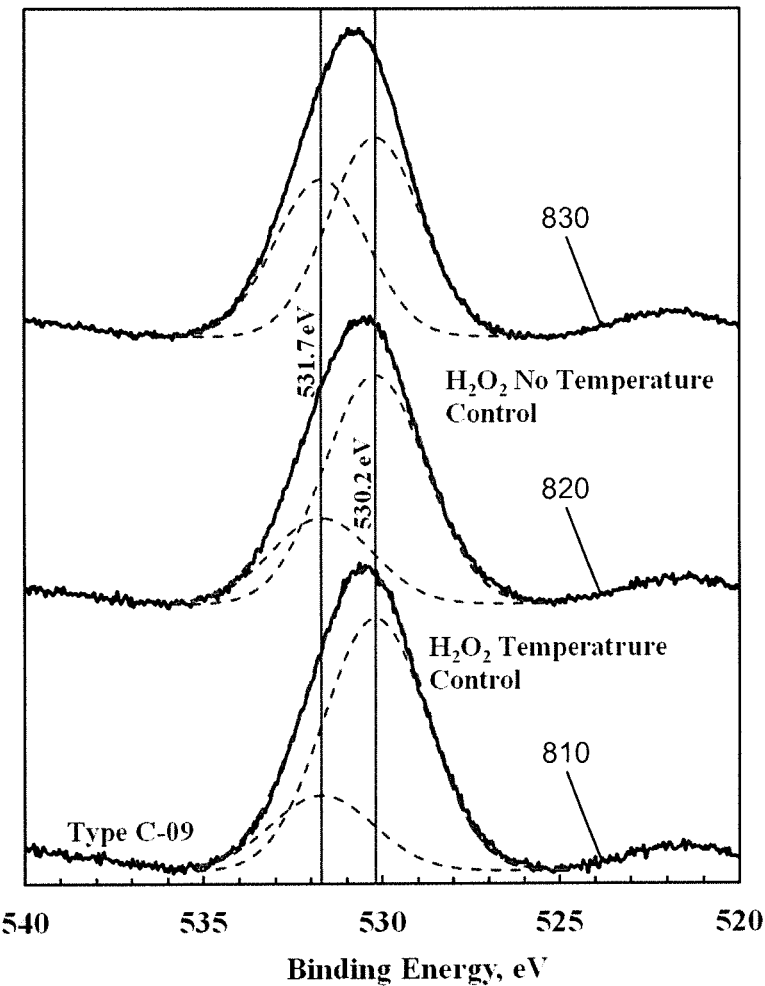

FIGS. 7-8 show that hydrogen peroxide treatment of the zirconium hydroxide increases DPPT reactivity. This increased reactivity is caused by mixing zirconium hydroxide with hydrogen peroxide to change the surface structure of the zirconium hydroxide and thereby increase the percentage of terminal hydroxyl groups. With reference to FIG. 7, five samples of type C-09 zirconium hydroxide were tested with a loading of 1-gram DPPT per 5 grams of zirconium hydroxide at 25° C. The samples were subject to gas chromatography-mass spectrometry (GC-MS). The first sample 710 was a baseline with no treatment and then four samples with successively more hydrogen peroxide (720, 730, 740 and 750) were produced. The extractions after solid state reactions show that hydrogen peroxide treatment increases the reactivity against DPPT (VX simulant) for type C zirconium oxide. With reference to FIG. 8, a baseline type C-09 zirconium hydroxide 810 was compared to type C-09 zirconium hydroxide treated with hydrogen peroxide with temperature control 820 and without temperature control 830. The hydrogen peroxide treatment is shown to increase the terminal hydroxyl groups to 28.8% and 44.0% respectively. As noted above, the terminal hydroxyl groups increase reactivity of zirconium hydroxide with chemical warfare agents. A possible breakdown pathway 900 for the VX simulant DPPT to dietheyl sulfide is shown in FIG. 9.

Figure 10:
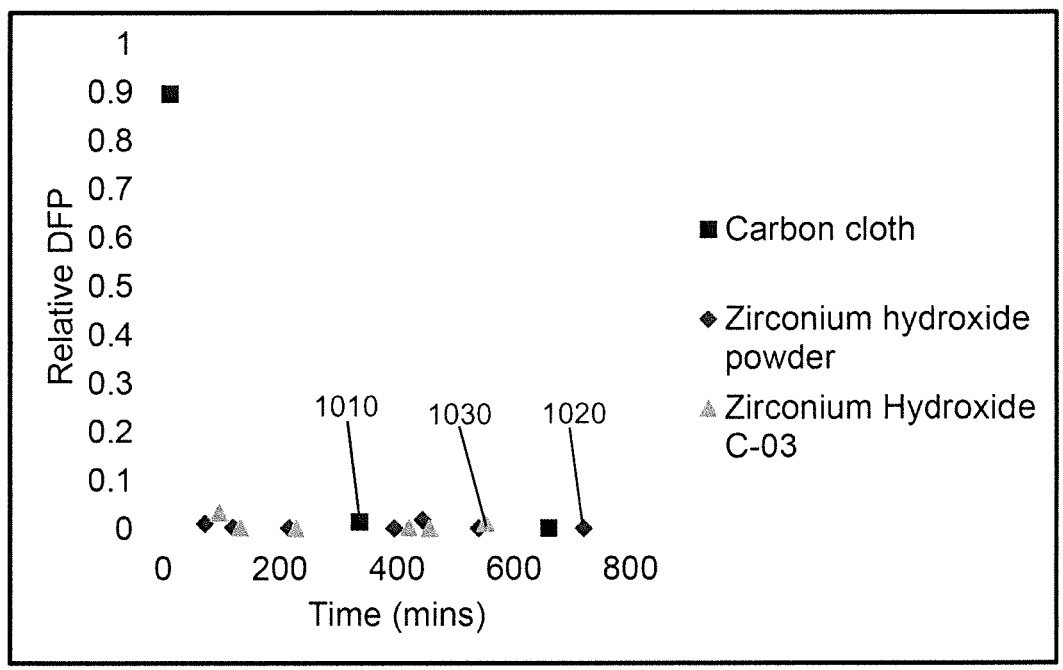
FIGS. 10 and 11 are graphs comparing the sorption of DFP by a carbon cloth to the sorption of DFP by zirconium hydroxide of differing types or surface treatments.
Figure 11:
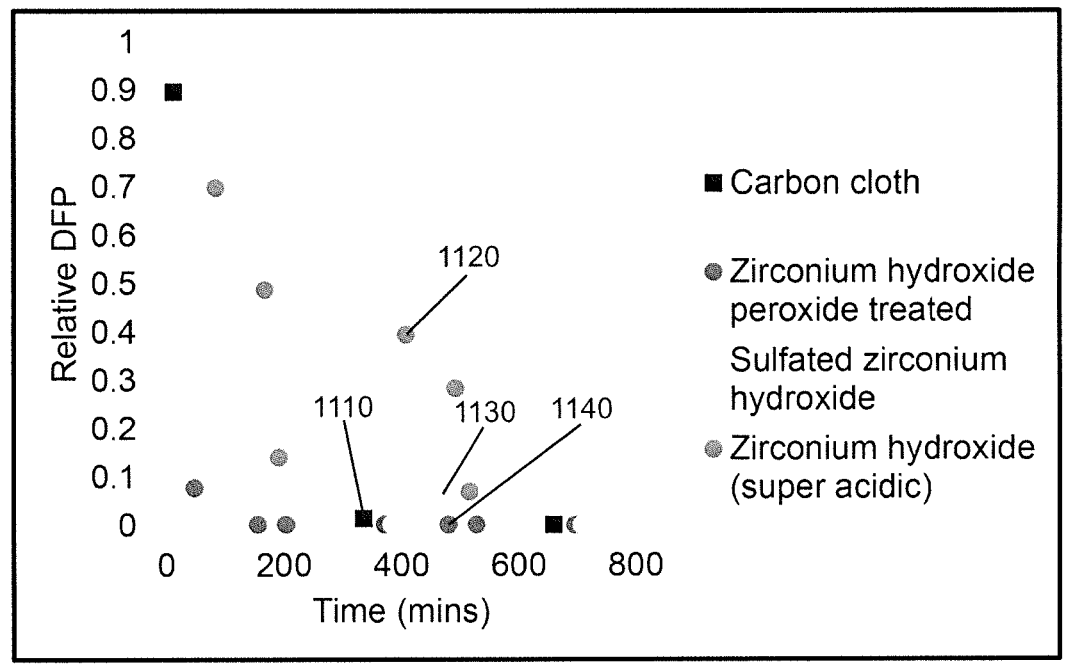

Another important feature of textile composite 10 is that the zirconium hydroxide should continue to be effective in a humid or sweaty environment. Activated carbon has sorption properties that are exploited to produce clothing to protect against chemical weapons. An activated carbon cloth was compared to different humidified zirconium powders with the results shown in FIG. 10, which is a graph showing the relative amount of diisopropylfluorophosphate (DFP) over time. More specifically a GC-MS analysis of vapor headspace shows the amount of DFP absorbed by a carbon cloth 1010, fabric with zirconium hydroxide powder 1020 and fabric with zirconium hydroxide type C-03 1030. The results show that all three samples provided absorption of DFP. A cloth impregnated with carbon was compared to fabric supporting different humidified zirconium powders having different surface treatments with the results shown in FIG. 11. More specifically a GC-MS analysis of vapor headspace shows the amount of DFP absorbed by a carbon cloth 1110, fabric with zirconium hydroxide treated with hydrogen peroxide 1120, fabric with sulfated zirconium hydroxide 1130 and fabric with super acidic zirconium hydroxide 1140 varied with the different surface treatments. Note that most of the sorption amounts of zirconium hydroxide were similar to the carbon cloth baseline. Hydrogen peroxide treated zirconium hydroxide 1140 performed similarly to carbon cloth 1110 but super acidic zirconium hydroxide 1120 did not perform that well.

Figure 12:
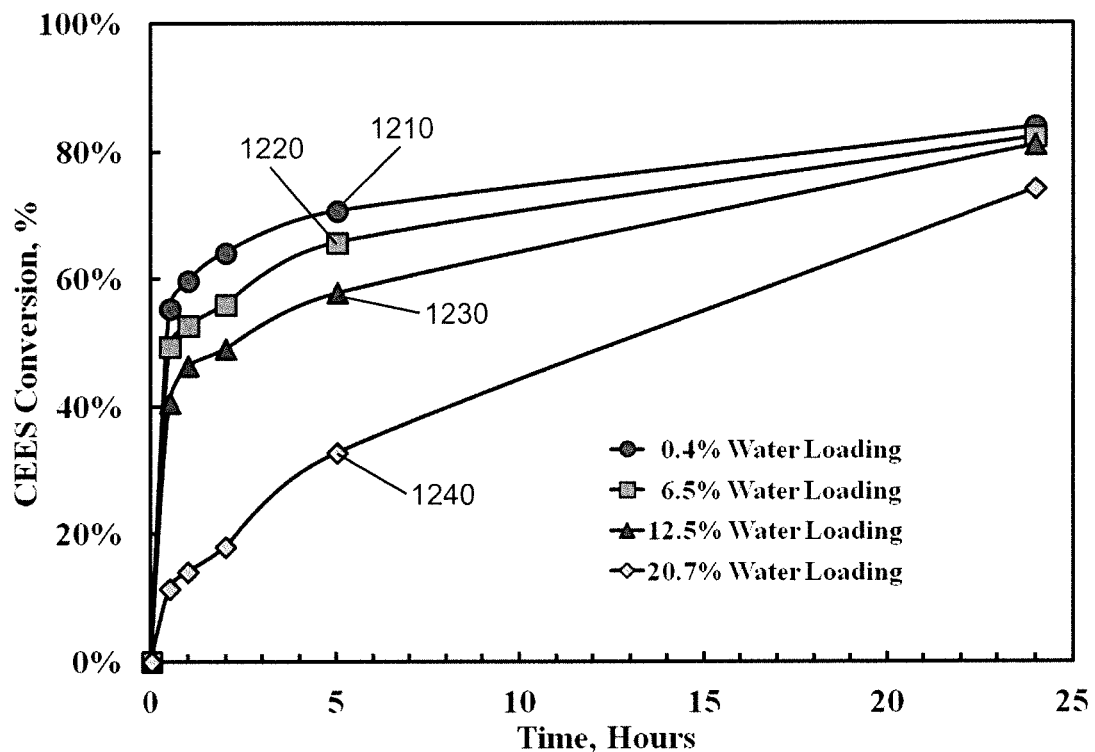
FIGS. 12 and 13 are graphs showing the effect of pre-adsorbed moisture on the rate of 2 CEES conversion or DPPT conversion, respectively, by zirconium hydroxide.
Figure 13:
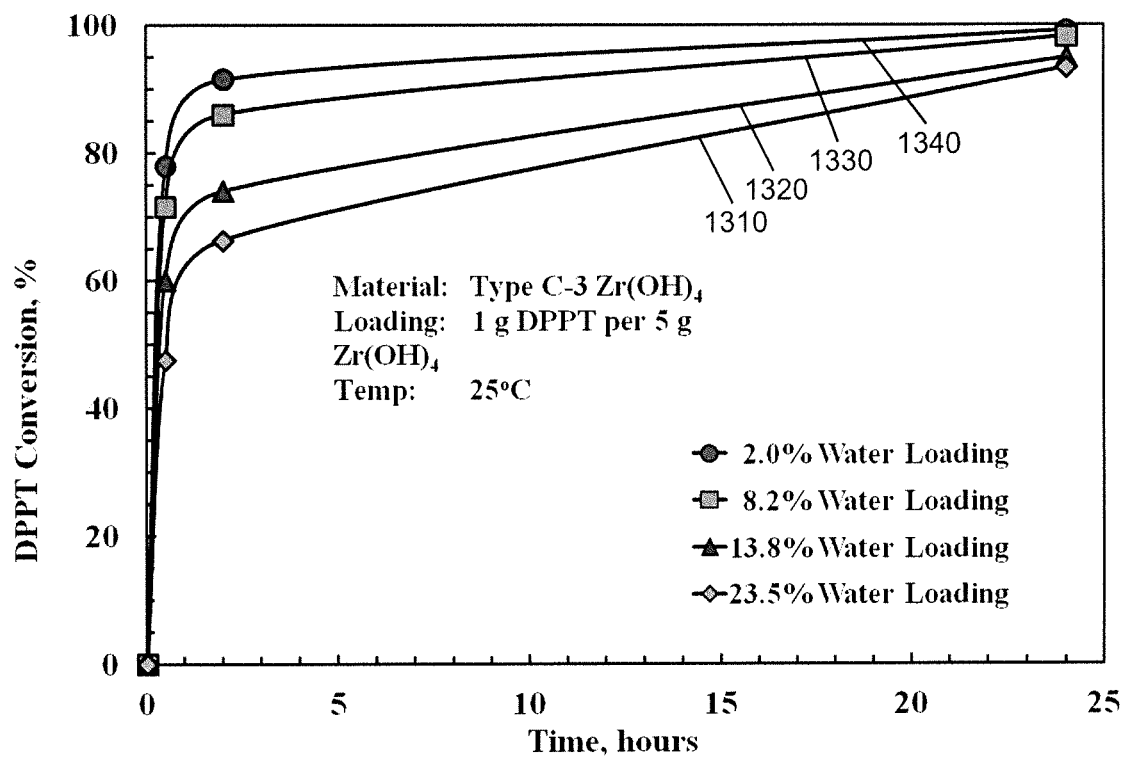
Figure 14:
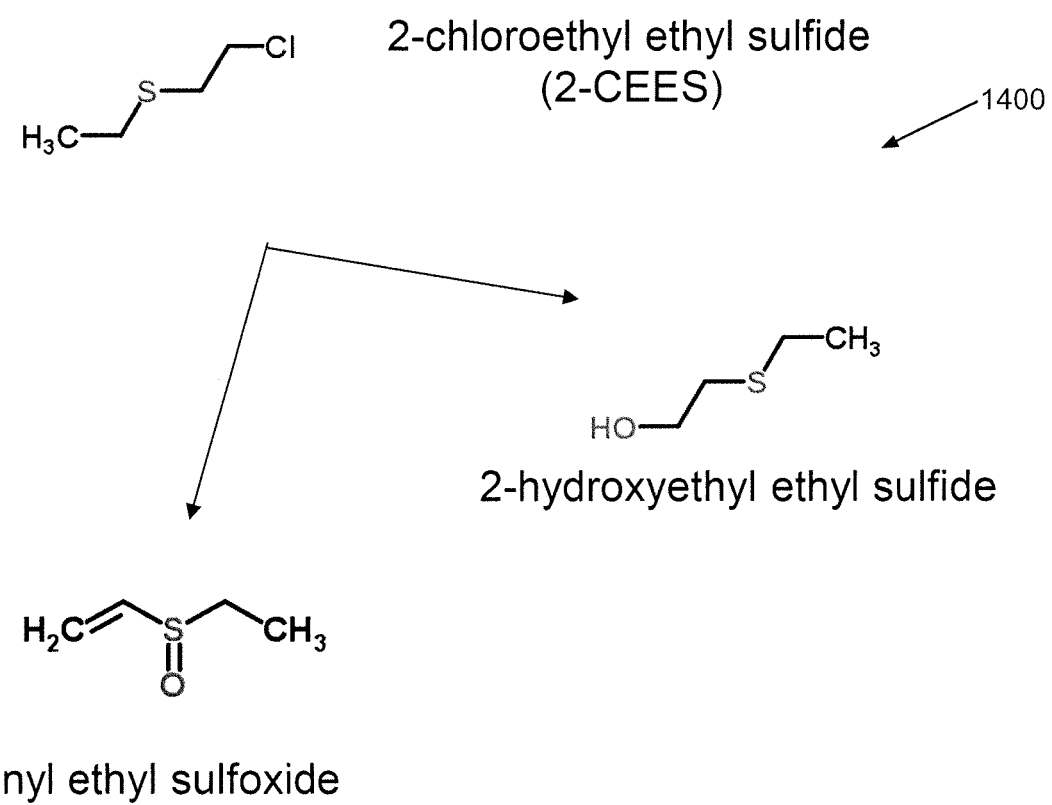
FIG. 14 is a schematic view of a breakdown pathway for an HD (mustard) simulant.

Turning now to FIGS. 12 and 13, there is shown the effect of moisture on zirconium oxide powders when increasing amounts of water loading are placed on type C-03 zirconium oxide. More specifically, FIG. 12 shows GC-MS extractions of contaminated powders having a pre-adsorbed moisture decreased rate of 2-CEES (2-chloroethyl ethyl sulfide a simulant for sulfur mustard HD) conversion. Note water loadings of 0.4% at 1210, 6.5% at 1220, 12.5% at 1230 and 20.7% water loading at 1240. FIG. 13 shows GC-MS extractions of contaminated powders having a pre-adsorbed moisture decreased rate of DPPT (diethyl phenyl phosphonothioate—a simulant for chemical agent VX) conversion. Note water loadings of 2.0% at 1310, 8.2% at 1320, 13.8% at 1330 and 23.5% water loading at 1340. The decreased rates shown FIGS. 12 and 13 are possibly due to blocked active sites. A possible breakdown path 1400 for the reaction in FIG. 12 of 2-CEES is shown in FIG. 14

Figure 15:
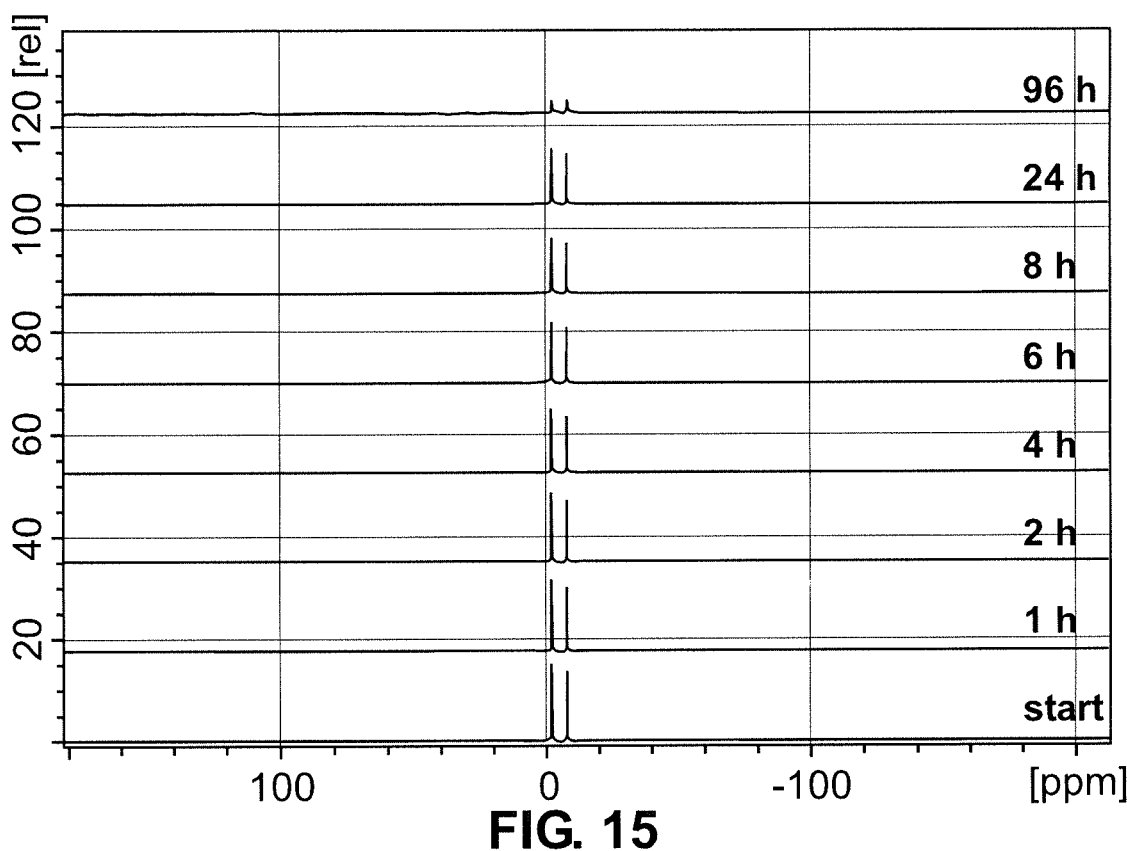
FIGS. 15 and 16 are graphs showing the effect of hydrogen peroxide surface treatment of zirconium hydroxide on the adsorption of DFP.
Figure 16:
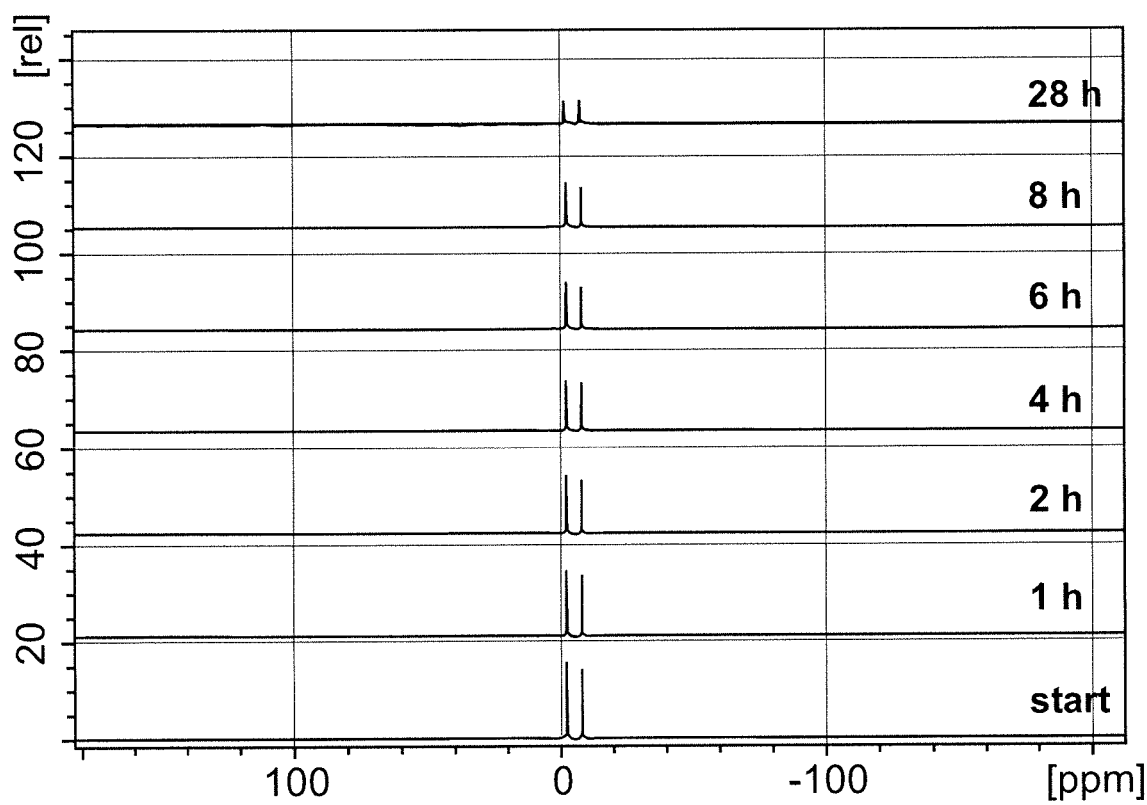
Figure 17:
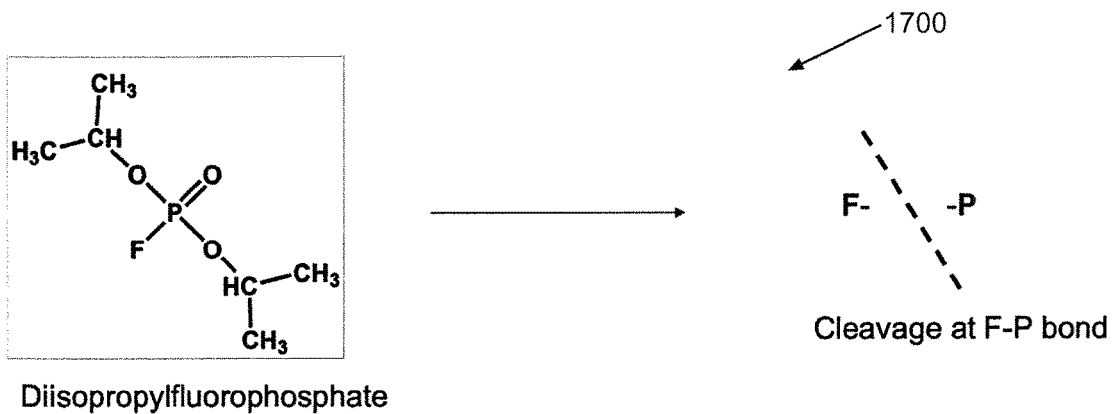
FIG. 17 is a schematic view of a breakdown pathway for a GD simulant.
Figure 18:
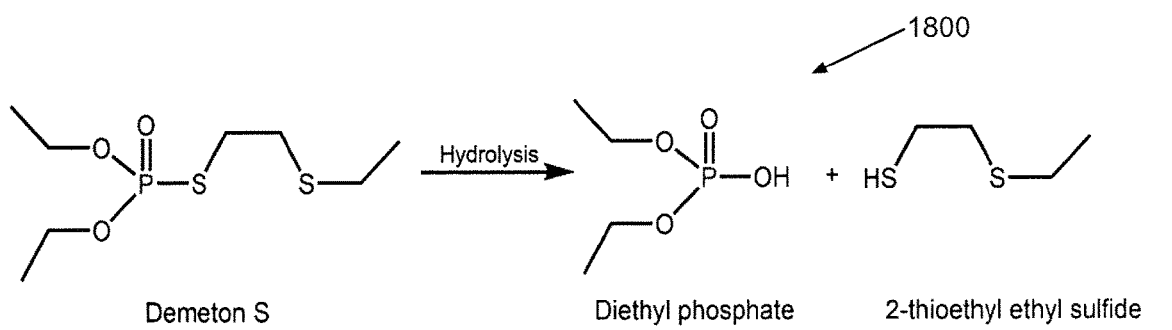
FIG. 18 is a schematic view of a breakdown pathway for Demeton S.
Figure 18:
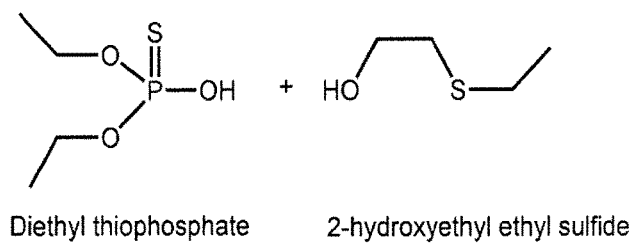

To confirm that fabrics with zirconium hydroxide treated with hydrogen peroxide performed better at sorption than a fabric with zirconium hydroxide without treatment, a solid state nuclear magnetic resonance (SS NMR) spectroscopy study was conducted. DFP absorption by a base powder of zirconium hydroxide is shown in FIG. 15, and DFP absorption by hydrogen peroxide treated zirconium hydroxide is shown in FIG. 16. While the SS NMR spectroscopy did confirm that the zirconium hydroxide treated with hydrogen peroxide performed better at sorption than an untreated base zirconium hydroxide, the SS NMR spectroscopy could not show whether or not reactivity was improved. A possible breakdown pathway for GD simulant is shown in FIG. 17, while FIG. 18 shows a possible breakdown pathway for Demeton S.

Figure 19:
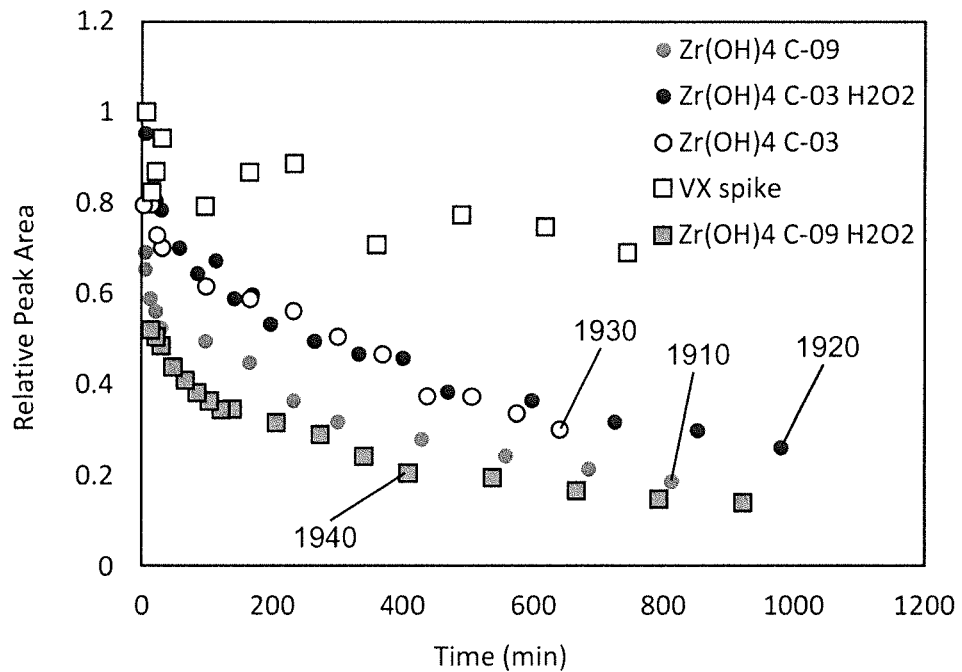
FIG. 19 is a graph showing the effect of sweat on the reactivity of zirconium hydroxide of various types and surface treatment.
Figure 20:
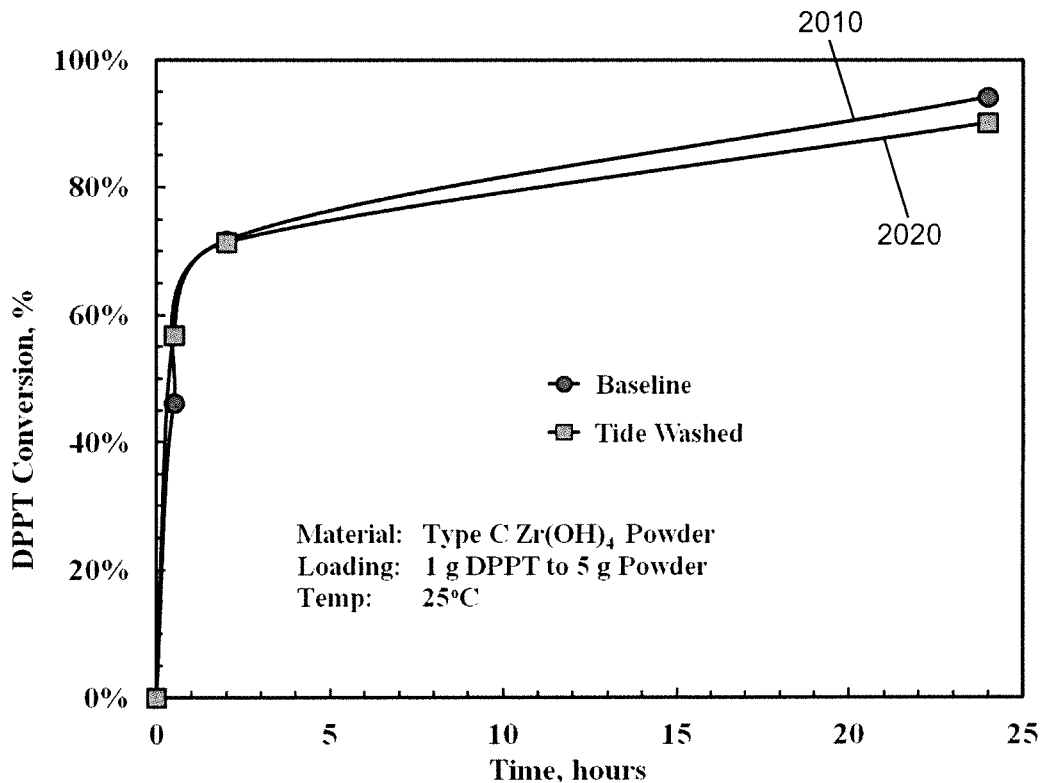
FIG. 20 is a graph showing the effect of laundering on the reactivity of zirconium hydroxide.

One of the important characteristics that textile composite 10 should possess is the ability to react with and adsorb chemical warfare weapons even when textile composite 10 is wet, or after textile composite 10 has been laundered. FIG. 19 shows VX breakdown by zirconium oxide powders during solution state nuclear magnetic resonance spectroscopy. This test simulates textile composite 10 being soaked with water or sweat. VX agent was tested at 1 gram of VX to 10 grams of catalyst, i.e., different types of zirconium oxide. More specifically, four types of zirconium oxide were tested: C-09 shown at 1910, C-03 treated with hydrogen peroxide shown at 1920, C-03 shown at 1930 and C-09 treated with hydrogen peroxide shown at 1940. As can be seen from FIG. 19, the treated zirconium oxide samples did surprisingly well. FIG. 20 shows a base material of type C zirconium oxide powder loaded with DPPT at 1 g DPPT to 5 g zirconium hydroxide powder at 25° C. having a DPPT conversion rate shown at 2010. A sample washed in TIDE laundry detergent was also tested having a DPPT conversion rate shown at 2020. There is seen to be no significant change in reactivity of the samples after washing with laundry detergent. The GC-MS extractions of contaminated powders show DPPT conversion by zirconium oxide was comparable before and after washing with laundry soap.

Figure 21:
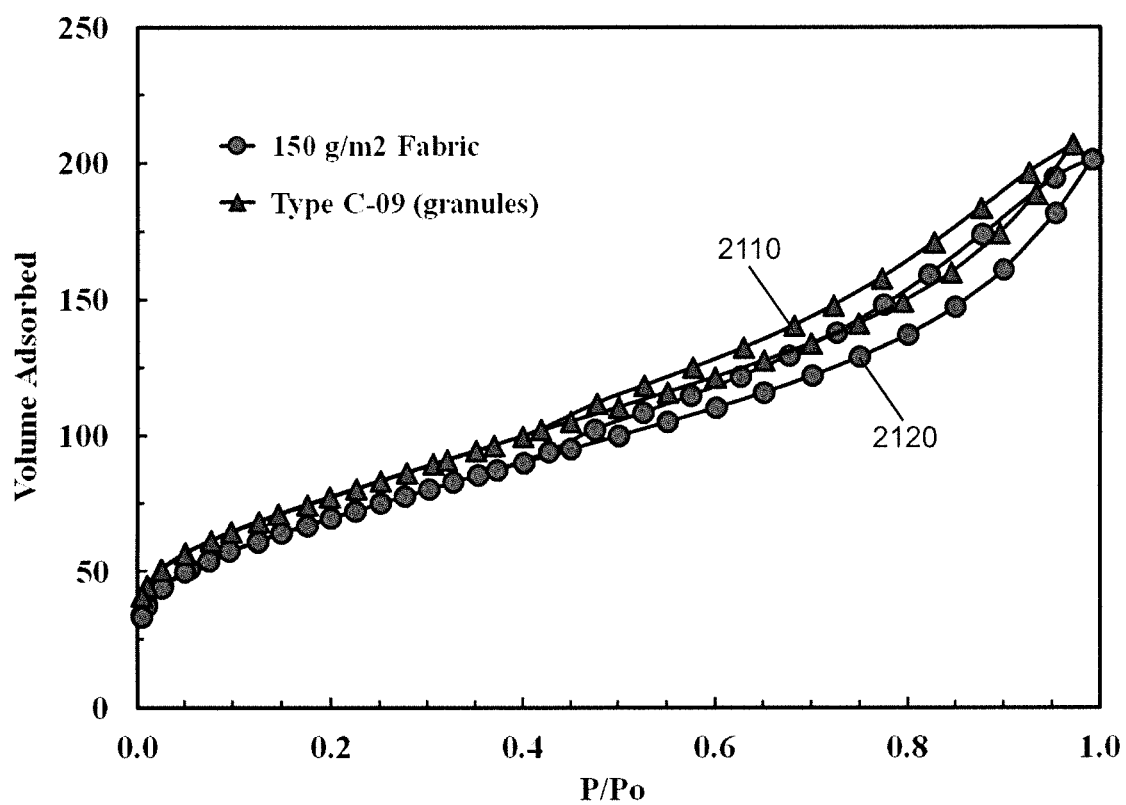
FIGS. 21-25 are graphs showing the properties of a textile loaded with zirconium hydroxide.
Figure 22:
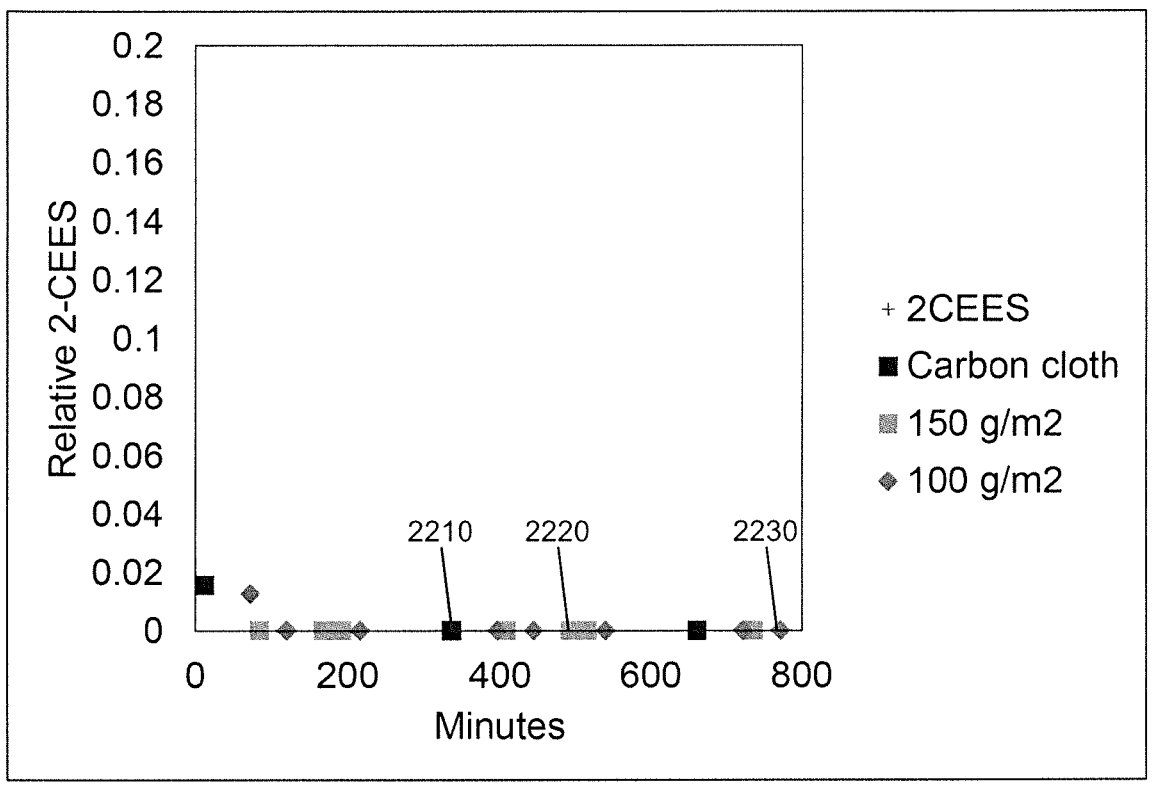
Figure 23:
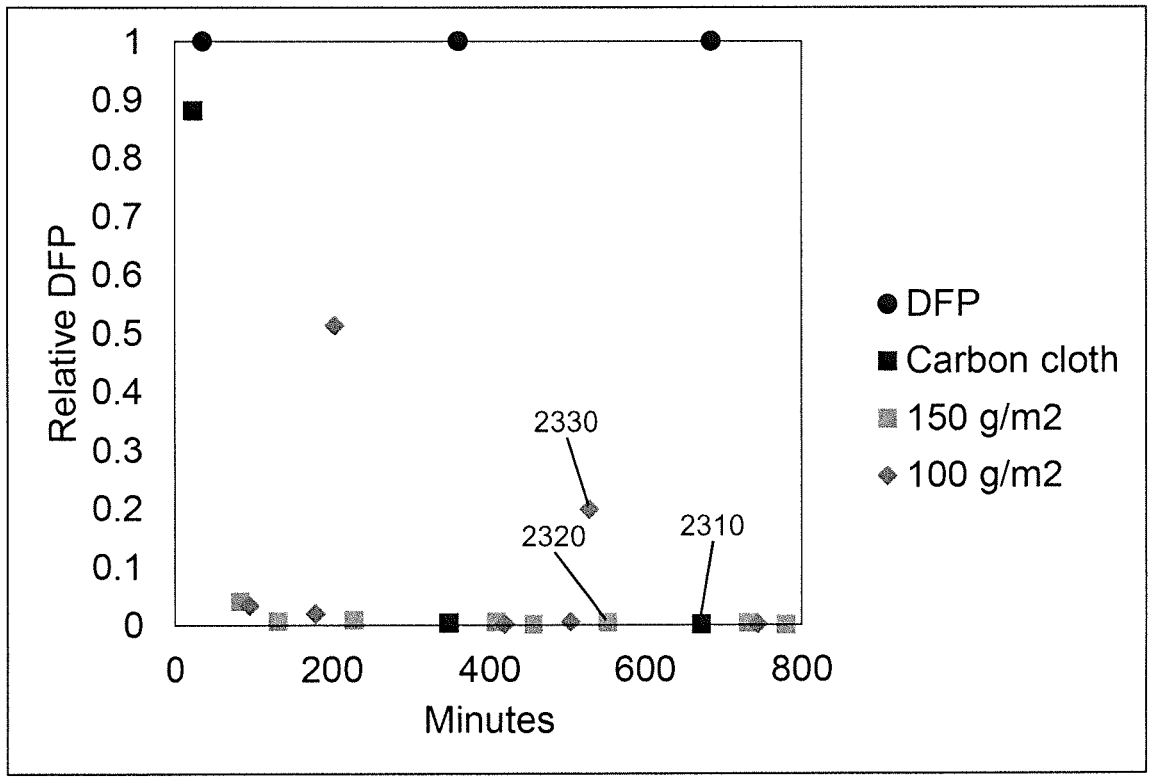

FIG. 21 shows the effect of placing zirconium hydroxide in a textile. Specifically, zirconium hydroxide type C-09 granules were tested alone and after being secured to a textile by an adhesive. As can be seen from FIG. 21, the volume of nitrogen adsorbed 2110 by zirconium hydroxide type C-09 granules was not significantly changed when the granules were loaded at 150 grams per square meter of fabric 2120. This test confirms that incorporation into a textile composite did not impact the surface properties of the zirconium hydroxide. As can be seen from FIGS. 22 and 23, zirconium hydroxide retained sorption capacity in a textile and performed similarly to a carbon sorptive. Note the 2-CEES adsorption in a humidified zirconium hydroxide loaded textile in FIG. 22 where carbon cloth 2210 is compared to textiles loaded at 150 grams per square meter (2220) and 100 grams per square meter (2230). Also note the DFP adsorption in a humidified zirconium hydroxide loaded textile in FIG. 23 where carbon cloth 2310 is compared to textiles loaded at 150 grams per square meter (2320) and 100 grams per square meter (2330).

Figure 24:
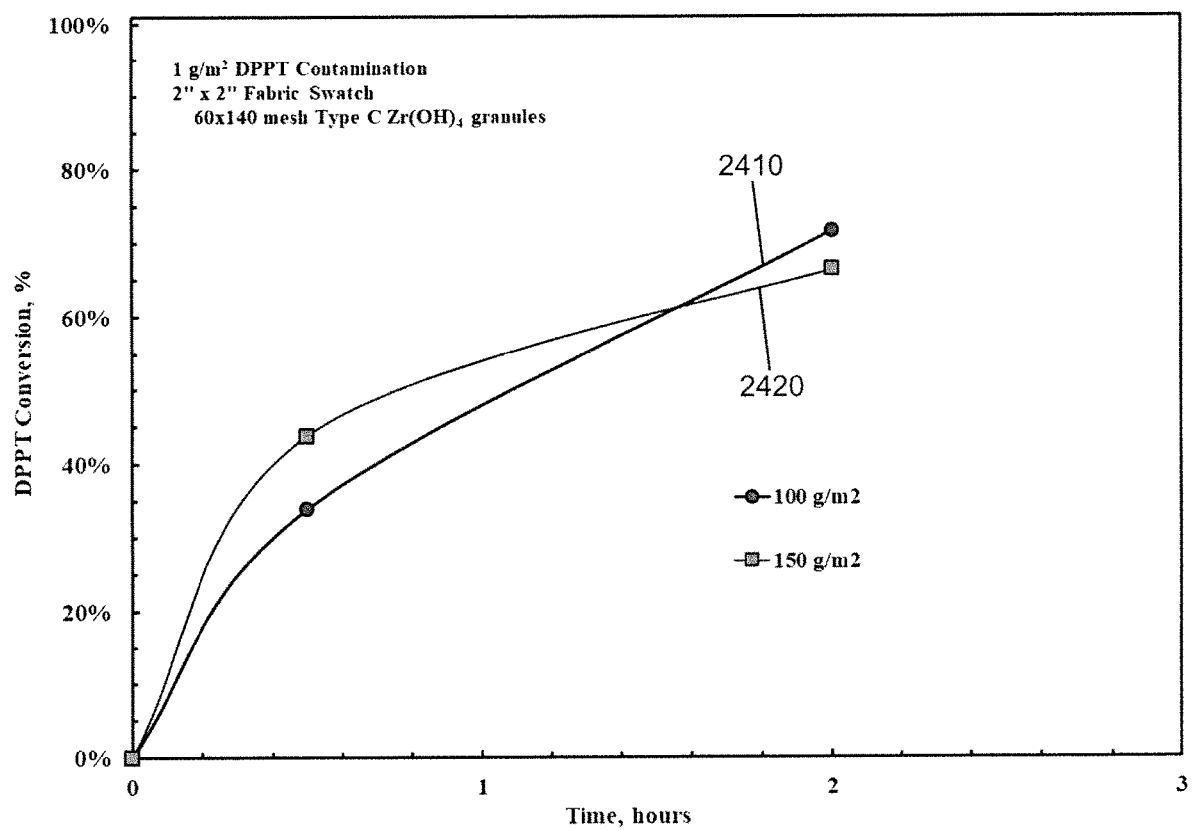

FIG. 24 shows the reactivity of a zirconium hydroxide loaded textile.

Specifically FIG. 24 shows that zirconium hydroxide retained capacity in a textile and that the reaction rate slowed. More specifically, there are shown GC-MS extractions of contaminated textiles which show DPPT conversion. FIG. 24 shows both a fabric loaded at 100 grams per meter squared at 2410 and 150 grams per meter squared at 2420. The DPPT migration slowed over time. This is possibly caused by the DPPT migrating through the textile before reaching the zirconium hydroxide.

Figure 25:
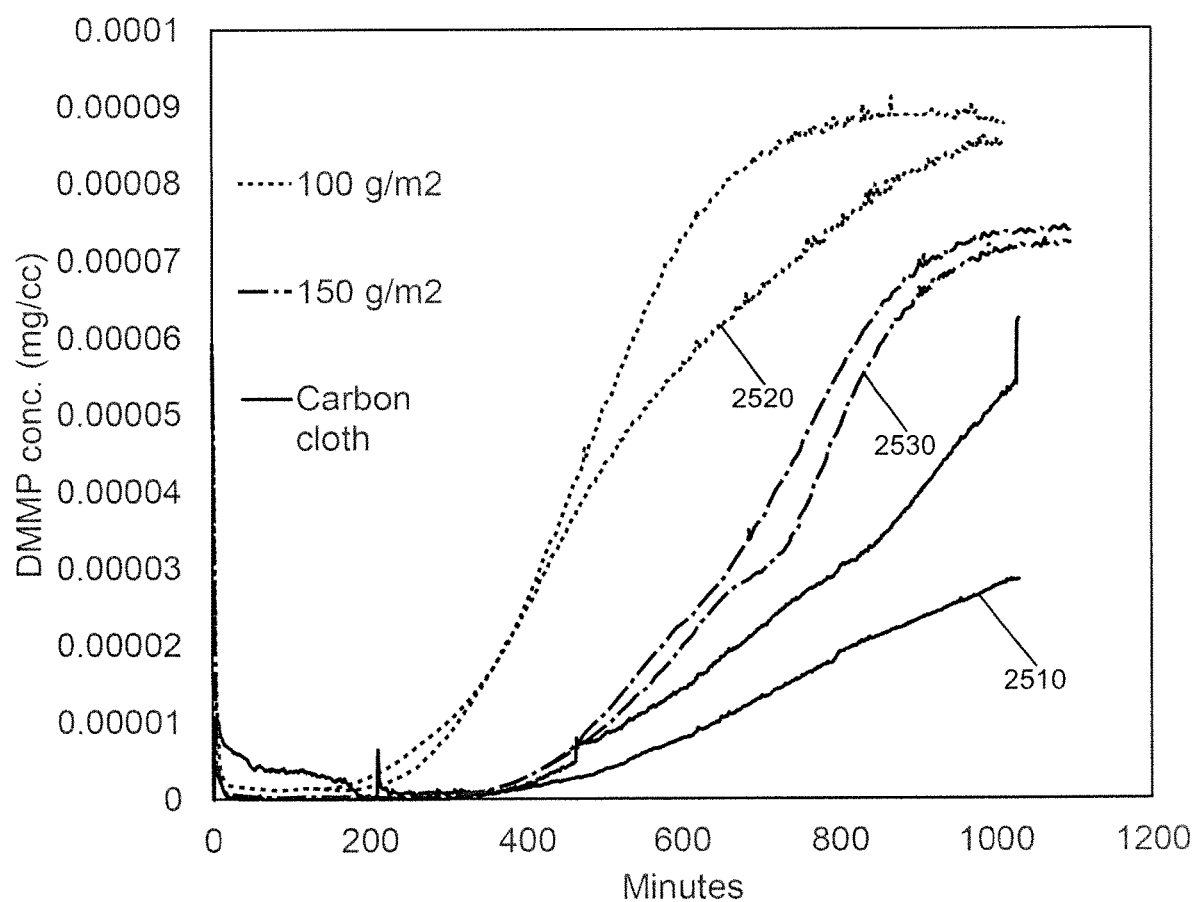

FIG. 25 shows the speed at which chemical warfare agents permeate through textiles. Carbon cloth at 2510 was compared to textiles loaded with zirconium oxide at 100 grams per meter squared at 2520 and 150 grams per meter squared at 2530. The test included a 5% saturated vapor stream of DMMP flowing across the fabric being tested. The time to permeate and break through the fabric was measured. As can be seen from FIG. 25, the highest loaded fabric 2530 had the same breakthrough time as a carbon sorptive 2510.

Figures 26, 27:
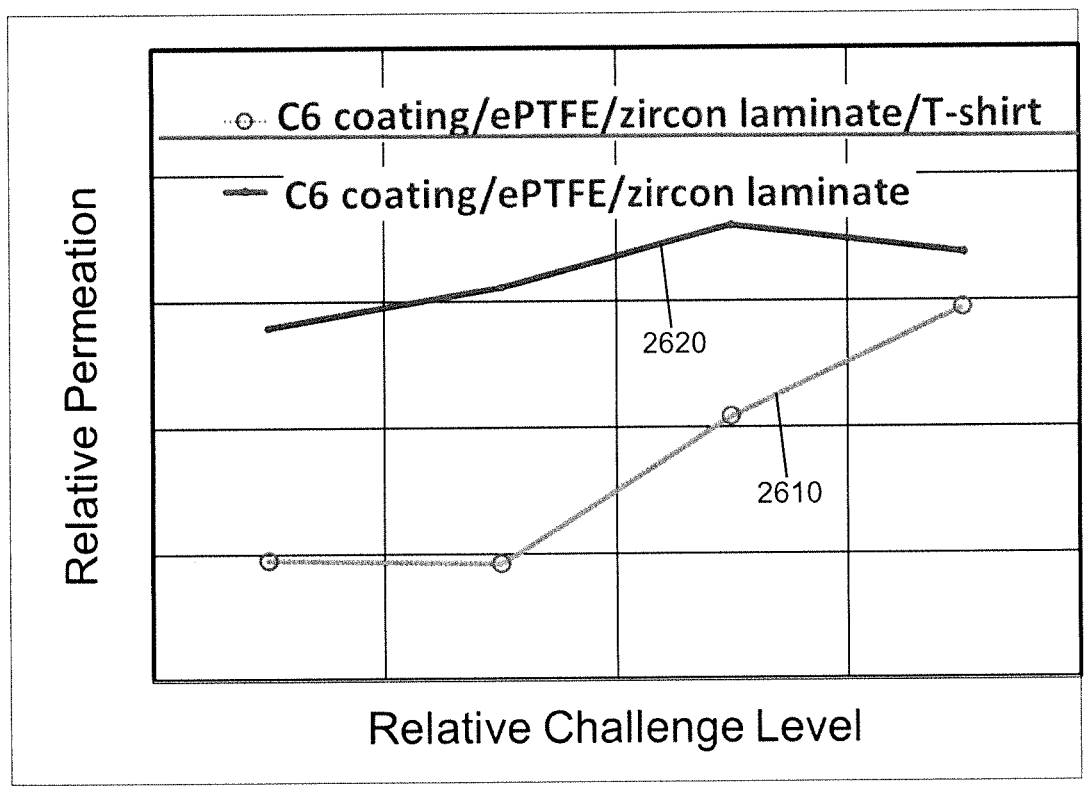
FIGS. 26 and 27 show the relative permeation of agents such as VX into garments loaded with zirconium oxide, with or without a T-shirt.

FIGS. 26 and 27 show how textiles loaded with zirconium hydroxide perform when compared to carbon-based textiles in terms of resisting increasing amounts of VX. Note FIG. 26 compares a composite with an omniphobicoated fabric atop and a T-shirt underneath at 2610 to a composite with an omniphobic coated fabric atop without a T-shirt at 2620. FIG. 27 shows a zirconium hydroxide coated textile with a T-shirt at 2710 versus 5 carbon-based materials, 2731-2735.

Table 1 shows how zirconium hydroxide particle properties affect the moisture vapor transport (MVTR) and air permeation (Air Perm) of various textiles loaded with the particles. Of interest is the difference in textile transport properties between the C-03- and C-09-loaded cotton knits. Also, higher loading of zirconium hydroxide on the cotton knit samples was seen to decrease both moisture vapor transport and air permeation. The choice of textile impacted textile transport properties significantly more than the level of zirconium hydroxide loading, or zirconium hydroxide particle size, as indicated by a two-way analysis of variance.

TABLE 1

| Sample | MVTR (g/m$^2$/day) | Air Perm (ft$^3$/min/ft$^2$) |
|---|---|---|
| C-09. Cotton knit, No aerosol web. 20 g/m$^2$ | 10628 ± 147 | 32.5 ± 1.6 |
| C-03. Cotton knit, No aerosol web. 20 g/m$^2$ | 8076 ± 67 | 25.9 ± 0.5 |
| C-09 (60 × 140 mesh). Cotton knit, No aerosol web. 20 g/m$^2$ | 11770 ± 147 | 49.9 ± 3.0 |
| C-09 Cotton knit, No aerosol web. 40 g/m$^2$ | 7239 ± 161 | 11.0 ± 0.4 |
| C-09. Cotton knit, PUR high efficiency aerosol web. 20 g/m$^2$ | 9412 ± 127 | 5.0 ± 0.2 |
| C-03. Cotton knit, PUR high efficiency aerosol web. 20 g/m$^2$ | 5650 ± 156 | 4.2 ± 0.2 |
| C-09 (60 × 140 mesh). Cotton knit, PUR high efficiency aerosol web. 20 g/m$^2$ | 10702 ± 47 | 5.2 ± 0.2 |
| C-09. Cotton knit, PUR high efficiency aerosol web. 40 g/m$^2$ | 3328 ± 523 | 3.2 ± 0.1 |
| 100 g/m$^2$ loading | 14300 | 351 |
| 150 g/m$^2$ loading | 12000 | 120 |

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A protective textile composite for sorbing and breaking down harmful chemical materials comprising:
   a protective layer including a support layer including a fabric material, and a sorptive and reactive material which is a material that both absorbs or adsorbs toxic chemicals and subsequently detoxifies the adsorbed or absorbed toxic chemicals, mounted on the support layer, said protective layer being configured to sorb and break down harmful chemical materials wherein the sorptive and reactive material is zirconium hydroxide and wherein the support layer has an aerosol resistant coating.

2. The textile composite of claim 1, wherein the zirconium hydroxide is distributed on an area of the fabric material in an amount of at least 20 grams of zirconium hydroxide per square meter of the area of the fabric material.

3. The textile composite of claim 2, wherein the zirconium hydroxide is distributed on an area of the fabric material in the amount of at least 150 grams of zirconium hydroxide per square meter of the fabric material.

4. The textile composite of claim 3, wherein the zirconium hydroxide is distributed on an area of the fabric material in the amount of at least 200 grams of zirconium hydroxide per square meter of the fabric material.

5. The textile composite of claim 1, wherein the zirconium hydroxide is laminated onto the fabric material.

6. The textile composite of claim 1, further comprising an adhesive securing the zirconium hydroxide to the fabric material.

7. The textile composite of claim 1, wherein the fabric material is a knit, woven, or nonwoven material and is selected from the group consisting of: natural materials, synthetic materials, and blends of natural and synthetic materials.

8. The textile composite of claim 1, wherein the fabric material is polyester.

9. The textile composite of claim 1, wherein the sorptive and reactive material includes zirconium hydroxide having surface treatments or functionalizations.

10. The textile composite of claim 1, wherein the sorptive and reactive material includes spray dried zirconium hydroxide microbeads.

11. The textile composite of claim 1, wherein the sorptive and reactive material includes granules of zirconium hydroxide.

12. The textile composite of claim 1, wherein the sorptive and reactive material is zirconium hydroxide in powder form and the textile composite does not include activated carbon.

13. The textile composite of claim 1, further comprising an inner liner formed from a vapor permeable fabric configured to allow passage of moisture vapor formed by perspiration.

14. The textile composite of claim 13, further comprising an outer layer formed of fabric including an outer surface that has an additional coating that is hydrophobic, oleophobic, or omniphobic, such that the outer surface is configured to resist passage of harmful chemicals formed as vapor, liquid and/or aerosol, said outer layer being mounted on the protective layer.

15. A protective textile composite for sorbing and breaking down harmful chemical materials comprising:
   a protective layer including a support layer including a fabric material and a sorptive and reactive material which is a material that both absorbs or adsorbs toxic chemicals and subsequently detoxifies the adsorbed or absorbed toxic chemicals, mounted on the support layer, said protective layer being configured to sorb and break down harmful chemical materials, wherein the sorptive and reactive material includes sulfated zirconium hydroxide or super acidic zirconium hydroxide.

16. The textile composite of claim 15, wherein the sorptive and reactive material includes super acidic zirconium hydroxide.

17. A method of manufacturing a textile composite for protection against harmful chemical materials, comprising:
   treating a surface area of zirconium hydroxide to form a treated zirconium hydroxide; and
   forming a protective layer with a support layer, and a sorptive and reactive material which is material that both absorbs or adsorbs toxic chemicals and subsequently detoxifies the adsorbed or absorbed toxic chemicals, mounted on the support layer, said protective layer configured to sorb and break down harmful chemical materials, wherein the sorptive and reactive material is the treated zirconium hydroxide and the support layer is a fabric material, wherein the support layer has an aerosol resistant coating, and forming the protective layer includes distributing the treated zirconium hydroxide on the fabric material in an amount of at least 20 grams of the treated zirconium hydroxide per square meter of the fabric material.

18. A protective garment comprising the textile composite of claim 1.

* * * * *